US011881995B2

(12) United States Patent
Baird (10) Patent No.: US 11,881,995 B2
(45) Date of Patent: *Jan. 23, 2024

(54) COORDINATED MANAGEMENT OF IOT DEVICE POWER CONSUMPTION AND NETWORK CONGESTION

(71) Applicant: T-Mobile USA, Inc., Bellevue, WA (US)

(72) Inventor: Joseph Baird, Kent, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,507

(22) Filed: Jan. 14, 2022

(65) Prior Publication Data

US 2022/0141086 A1 May 5, 2022

Related U.S. Application Data

(63) Continuation of application No. 16/690,053, filed on Nov. 20, 2019, now Pat. No. 11,252,031.

(51) Int. Cl.
*H04L 12/70* (2013.01)
*H04L 41/082* (2022.01)
(Continued)

(52) U.S. Cl.
CPC .......... *H04L 41/082* (2013.01); *H04L 12/281* (2013.01); *H04L 12/2809* (2013.01);
(Continued)

(58) Field of Classification Search
CPC . H04L 41/082; H04L 12/2814; H04L 12/281; H04L 41/0853; H04L 12/2809;
(Continued)

(56) References Cited

U.S. PATENT DOCUMENTS 6,462,660 B1 10/2002 Cannon et al.
6,548,990 B2 4/2003 Okuno et al.
(Continued)

FOREIGN PATENT DOCUMENTS

WO 2017142840 A1 8/2017
WO WO-2017142840 A1 * 8/2017 ....... G06Q 10/06311

OTHER PUBLICATIONS

U.S. Appl. No. 17/356,360, Office Action dated Aug. 3, 2022, 59 pages.
(Continued)

*Primary Examiner* — Ario Etienne
*Assistant Examiner* — Elizabeth Kassa (57) ABSTRACT

A system for coordinated management of Internet of Things (IoT) devices to minimize power consumption and network congestion is provided. A mobile device designated as local group management device (LGMD) identifies a group of IoT devices that are configured to access a network. The mobile device receives information regarding an upcoming event involving the group of IoT devices. The mobile device generates usage knowledge specifying the group of IoT devices, a location, and a time associated with the upcoming event. The mobile device receives configuration update data that are generated based on the usage knowledge for scheduling operations of the group IoT devices. The mobile device delivers the configuration update data to the group of IoT devices.

18 Claims, 8 Drawing Sheets

(51) Int. Cl.
  *H04L 41/0853* (2022.01)
  *H04W 76/11* (2018.01)
  *H04L 12/28* (2006.01)
(52) U.S. Cl.
  CPC ...... *H04L 12/2814* (2013.01); *H04L 41/0853* (2013.01); *H04W 76/11* (2018.02)
(58) Field of Classification Search
  CPC ... H04L 41/147; H04L 41/16; H04L 41/0823; H04L 41/0893; H04W 76/11
  USPC .......................................................... 709/221
  See application file for complete search history.

(56) References Cited

U.S. PATENT DOCUMENTS

| | | | |
|---|---|---|---|
| 7,825,794 | B2 | 11/2010 | Janetis et al. |
| 8,851,019 | B2 | 10/2014 | Jesurum |
| 9,226,150 | B2 | 12/2015 | Li et al. |
| 9,801,017 | B2 | 10/2017 | Choi et al. |
| 9,820,231 | B2 | 11/2017 | Gorgenyi et al. |
| 9,967,391 | B2 | 5/2018 | Frenz et al. |
| 9,984,521 | B1 | 5/2018 | Kusens et al. |
| 9,998,866 | B2 | 6/2018 | Natucci, Jr. et al. |
| 10,318,001 | B1 | 6/2019 | Spears et al. |
| 10,395,452 | B2 | 8/2019 | Morrison et al. |
| 10,448,203 | B2 | 10/2019 | Bottazzi et al. |
| 10,484,090 | B2 | 11/2019 | Saes et al. |
| 10,623,944 | B2 | 4/2020 | Park et al. |
| 10,750,044 | B2 | 8/2020 | Hayashi et al. |
| 10,764,907 | B2 | 9/2020 | Ravindran et al. |
| 10,852,154 | B1 | 12/2020 | Knas et al. |
| 2002/0175820 | A1 | 11/2002 | Oja et al. |
| 2006/0055536 | A1 | 3/2006 | Jackson |
| 2006/0066450 | A1 | 3/2006 | Jackson |
| 2006/0221893 | A1 | 10/2006 | Kiss |
| 2006/0232398 | A1 | 10/2006 | Nedblake et al. |
| 2007/0150607 | A1 | 6/2007 | Flinchem et al. |
| 2007/0252690 | A1 | 11/2007 | Pate |
| 2008/0191866 | A1 | 8/2008 | Falck et al. |
| 2009/0231125 | A1 | 9/2009 | Baldus et al. |
| 2009/0289844 | A1 | 11/2009 | Palsgrove et al. |
| 2010/0027513 | A1 | 2/2010 | Ikeda |
| 2010/0123560 | A1 | 5/2010 | Nix et al. |
| 2010/0138581 | A1 | 6/2010 | Bird et al. |
| 2011/0092161 | A1 | 4/2011 | Dotan |
| 2011/0274093 | A1 | 11/2011 | Sing et al. |
| 2011/0297090 | A1 | 12/2011 | Chamberlain et al. |
| 2012/0034934 | A1 | 2/2012 | Loveland et al. |
| 2012/0034946 | A1 | 2/2012 | Skalicky |
| 2012/0090038 | A1 | 4/2012 | Pacella et al. |
| 2012/0309376 | A1 | 12/2012 | Huang et al. |
| 2013/0159749 | A1 | 6/2013 | Moeglein et al. |
| 2014/0073300 | A1 | 3/2014 | Leeder et al. |
| 2014/0134990 | A1 | 5/2014 | Chou |
| 2014/0141795 | A1 | 5/2014 | Abraham et al. |
| 2014/0240088 | A1 | 8/2014 | Robinette et al. |
| 2014/0241354 | A1* | 8/2014 | Shuman .................. H04W 4/08 370/390 |
| 2014/0244834 | A1* | 8/2014 | Guedalia ................ H04W 4/08 709/224 |
| 2014/0251233 | A1 | 9/2014 | Bianchi et al. |
| 2014/0331295 | A1 | 11/2014 | Kumar et al. |
| 2015/0002292 | A1 | 1/2015 | Cavalcanti et al. |
| 2015/0046330 | A1 | 2/2015 | Hanafi et al. |
| 2015/0350410 | A1 | 12/2015 | Weiss et al. |
| 2016/0021506 | A1 | 1/2016 | Bonge, Jr. |
| 2016/0044628 | A1 | 2/2016 | Nakao |
| 2016/0266606 | A1 | 9/2016 | Ricci |
| 2016/0287097 | A1 | 10/2016 | Pradeep et al. |
| 2016/0292576 | A1 | 10/2016 | Pradeep et al. |
| 2016/0302393 | A1 | 10/2016 | Pradeep et al. |
| 2017/0094581 | A1 | 3/2017 | Sun et al. |
| 2017/0094717 | A1 | 3/2017 | Yang et al. |
| 2017/0111763 | A1 | 4/2017 | Morgan et al. |
| 2017/0111770 | A1 | 4/2017 | Kusens |
| 2017/0132900 | A1 | 5/2017 | Lee et al. |
| 2017/0357835 | A1 | 12/2017 | Oono et al. |
| 2018/0077449 | A1* | 3/2018 | Herz ....................... H04L 67/12 |
| 2018/0121993 | A1 | 5/2018 | Agarwal et al. |
| 2018/0159958 | A1* | 6/2018 | Olive ...................... H04L 67/34 |
| 2018/0184253 | A1 | 6/2018 | Lorenzo et al. |
| 2018/0255428 | A1 | 9/2018 | Bagchi et al. |
| 2018/0295472 | A1 | 10/2018 | High et al. |
| 2018/0332033 | A1 | 11/2018 | Lakhani et al. |
| 2018/0365964 | A1 | 12/2018 | Carson et al. |
| 2018/0376417 | A1* | 12/2018 | Wang .................. H04W 52/0254 |
| 2019/0058989 | A1 | 2/2019 | Park et al. |
| 2019/0087087 | A1 | 3/2019 | Ono |
| 2019/0132816 | A1 | 5/2019 | Xue et al. |
| 2019/0156643 | A1 | 5/2019 | Quilter |
| 2019/0171988 | A1 | 6/2019 | Kwatra et al. |
| 2019/0208356 | A1 | 7/2019 | Danknick |
| 2019/0271558 | A1 | 9/2019 | Zhao |
| 2019/0279450 | A1 | 9/2019 | Kusens et al. |
| 2019/0289158 | A1 | 9/2019 | Inoue |
| 2019/0321733 | A1 | 10/2019 | Kim et al. |
| 2019/0370507 | A1 | 12/2019 | Byrd et al. |
| 2019/0371102 | A1 | 12/2019 | Prostko et al. |
| 2020/0042947 | A1 | 2/2020 | Rakshit et al. |
| 2020/0122741 | A1 | 4/2020 | Kuehnle et al. |
| 2020/0125921 | A1* | 4/2020 | Manico ............... G06F 3/04817 |
| 2020/0187452 | A1 | 6/2020 | Daniel |
| 2020/0235994 | A1* | 7/2020 | Rusev ..................... H04L 43/08 |
| 2020/0296234 | A1 | 9/2020 | Saita |
| 2021/0126888 | A1 | 4/2021 | Drevö et al. |

OTHER PUBLICATIONS

Bachpalle et al., Integration of Sensors for Location Tracking using Internet of Things (Year: 2018).

Balakrishnan et al., Efficient Geo-Tracking and Adaptive Routing of Mobile Assets (Year: 2009).

Garzon et al., Infrastructure-Assisted Geofencing Proactive Location-Based Services with Thin Mobile Clients and Smart Servers (Year: 2015).

He et al., User privacy and data trustworthiness in mobile crowd sensing (Year: 2015).

Kulshrestha, et al. An Improved Smartphone-based Non-Participatory Crowd Monitoring System in Smart Environments. IEEE Xplore. Jul. 21-24, 2017 [online][retrieved on Mar. 18, 2021] Retrieved from the Internet URL: https://ieeexplore.ieee.org/document/8005986.

Schmitt, et al. OTioT—A Browser-based Object Tracking Solution for the Internet of Things. IEEE Xplore. Feb. 5-8, 2018 [online][retrieved on Mar. 18, 2021] Retrieved from the Internet URL: https://ieeexplore.ieee.org/document/8355157.

Shivhare, et al. A Study on Geo-Location Authentication Techniques. IEEE Xplore. Nov. 14-16, 2014 [online] [retrieved on Mar. 18, 2021] Retrieved from the Internet URL: https://ieeexplore.ieee.org/document/7065581.

Tang, et al. A Smart Low-consumption IoT Framework for Location Tracking and its Real Application. IEEE Xplore. Jun. 17-19, 2016 [online][retrieved on Mar. 18, 2021] Retrieved from the Internet URL: https://ieeexplore.ieee.org/document/7589744.

Thengal, et al. Parameter Sensing and Object Tracking using Global Positioning System. IEEE Xplore. Dec. 15-17, 2016 [online][retrieved on Mar. 18, 2021] Retrieved from the Internet URL: https://ieeexplore.ieee.org/document/7977099.

U.S. Appl. No. 16/252,506, Final Office Action dated Sep. 22, 2020, 24 pages.

U.S. Appl. No. 16/252,506, Notice of Allowance dated Jan. 14, 2021, 24 pages.

U.S. Appl. No. 16/252,506, Notice of Allowance dated Apr. 19, 2021, 21 pages.

U.S. Appl. No. 16/252,506, Notice of Allowance dated Mar. 23, 2021, 27 pages.

U.S. Appl. No. 16/252,506, Office Action dated Mar. 19, 2020, 17 pages.

(56) References Cited

OTHER PUBLICATIONS

U.S. Appl. No. 16/690,053, Final Office Action dated Jul. 9, 2021, 60 pages.
U.S. Appl. No. 16/690,053, Notice of Allowance dated Oct. 12, 2021, 57 pages.
U.S. Appl. No. 16/690,053, Office Action dated Mar. 8, 2021, 57 pages.
U.S. Appl. No. 16/752,543, Non Final Office Action dated Jul. 8, 2020, 68 pages.
U.S. Appl. No. 16/752,543, Notice of Allowance dated Mar. 23, 2021, 72 pages.
U.S. Appl. No. 16/752,543, Notice of Allowance dated Jan. 27, 2021, 64 pages.
U.S. Appl. No. 17/356,360, Notice of Allowance dated Feb. 3, 2023, 63 pages.
U.S. Appl. No. 17/356,360, Notice of Allowance dated Jan. 11, 2023, 45 pages.

\* cited by examiner

COORDINATED MANAGEMENT OF IOT DEVICE POWER CONSUMPTION AND NETWORK CONGESTION

CROSS-REFERENCE TO RELATED APPLICATIONS

This application is a continuation of U.S. application Ser. No. 16/690,053, filed on Nov. 20, 2019, and titled "COORDINATED MANAGEMENT OF IOT DEVICE POWER CONSUMPTION AND NETWORK CONGESTION," which is herein incorporated by reference in its entirety.

BACKGROUND

The Internet of Things, or IoT, is a system of interrelated computing devices, mechanical and digital machines, objects, animals or people that are provided with unique identifiers (UIDs) and the ability to transfer data over a network without requiring human-to-human or human-to-computer interaction. In the consumer market, IoT technology covers devices and appliances (such as lighting fixtures, thermostats, home security systems and cameras, and other home appliances) that support one or more common ecosystems, and can be controlled via devices associated with that ecosystem, such as smart phones and smart speakers.

Network resources, such as router processing time and link throughput, are limited. Resource contention may occur on networks in a number of common circumstances. A wireless local area network (Wireless LAN or WLAN) is easily filled by a single personal computer. Even on fast computer networks, the backbone of the network infrastructure can easily be congested by a few servers and client computing devices. In telephone networks, a mass call event can overwhelm digital telephone circuits.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to systems and techniques for actively managing power consumption of the Internet of Things (IoT) devices to moderate both individual IoT device power consumption and system network congestion in a system where IoT devices communicate with a service provider's telecommunications network. In some embodiments, adjustments or configuration update data from the network to IoT devices in a particular geographic area are generated based on available resources in that area (e.g., network resources, and IoT device resources such as available power/energy reserves and communications capabilities) and/or purposes and activities of the users involving the IoT devices in that area.

In some embodiments, multiple devices (including IoT devices) in a group can communicate with each other wirelessly. One or several of the devices may be designated or configured as a local group management device (LGMD) to proactively or reactively upload data for all devices in the group to the network. The LGMD can be a smart phone capable of uploading data to the network from the other devices in the group and also receiving information from the network and translating the received information into active local management of the devices in the group. In some embodiments, multiple co-located IoT devices are assigned a same group ID by the telecommunications service provider (TSP), and one device is designated as the LGMD of the group ID while the co-located IoT devices are powered down or put on standby.

Figure 1:
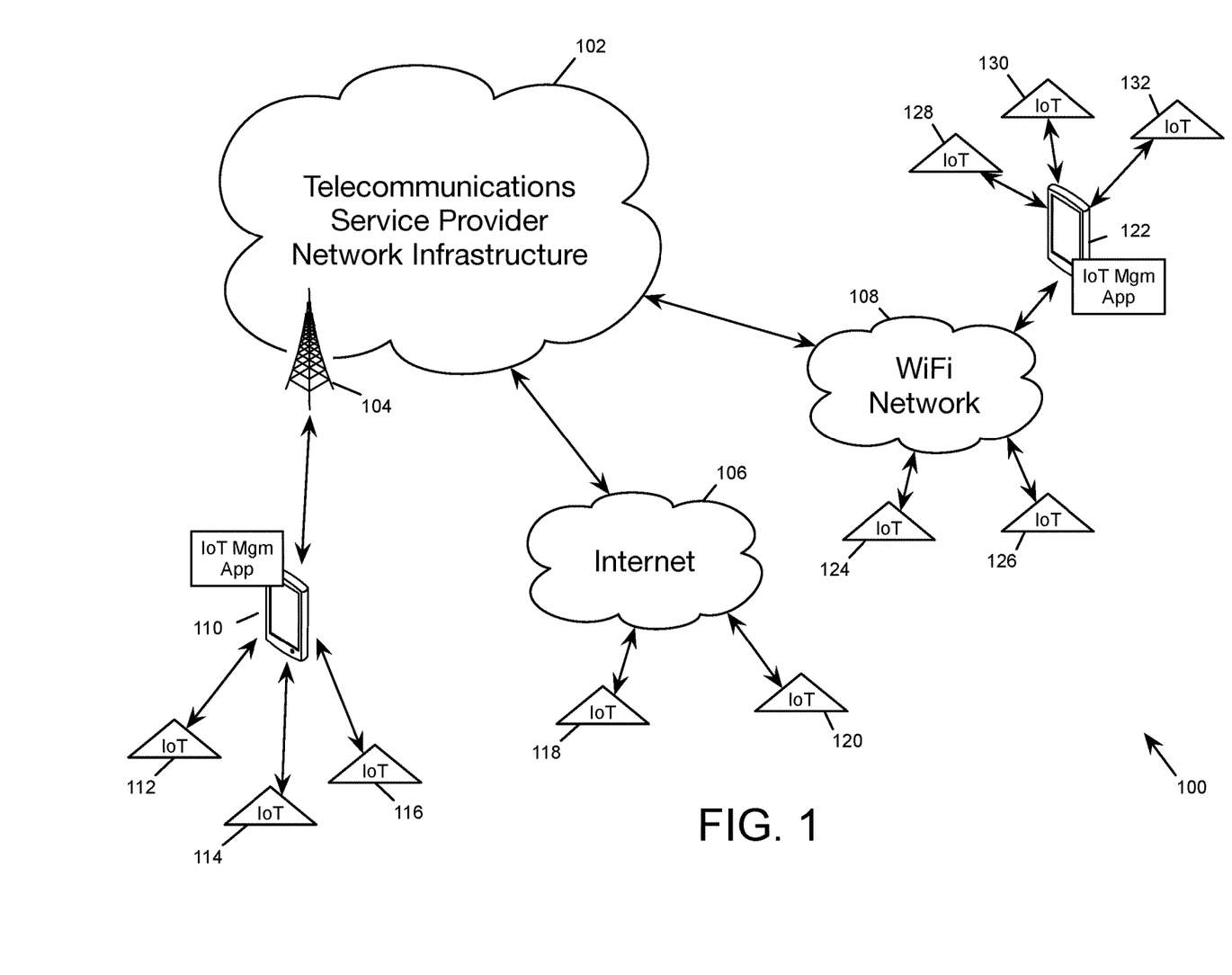
FIG. 1 conceptually illustrates a network in which groups of co-located IoT devices are managed by designated local group management devices (LGMDs).

FIG. 1 conceptually illustrates a network 100 in which groups of co-located IoT devices are managed by designated LGMDs. The network 100 includes a telecommunications service provider network infrastructure 102, which is operated by a wireless telecommunications service provider such as a cellular carrier. The network infrastructure 102 is accessible through multiple different mediums. User devices and IoT devices may access the network infrastructure 102 through service provider equipment 104, the Internet 106, or a Wi-Fi 108 (may also be a Wireless LAN, or a wireless network of another type). As illustrated, a user device 110 and IoT devices 112, 114, and 116 may access the network infrastructure 102 through service provider equipment 104 (e.g., base stations and cellular towers). IoT devices 118 and 120 may access the network infrastructure 102 through the Internet 106. A user device 122 and IoT devices 124, 126, 128, 130, and 132 may access the network infrastructure 102 through the WLAN 108 (through a WLAN hotspot that is connected to the network infrastructure 102 or the Internet 106).

The network infrastructure 102 may include a core network of the telecommunications service provider (TSP). The network infrastructure 102 may include routers, switches, or other types of data forwarding elements for conducting data traffic (e.g., packet traffic) between various network endpoints such as user devices, base stations, hotspots, and other types of computing resources. The core network also provides access to external networks such as the Internet 106. The core network may include components that provide services to the subscribers of the cellular network and track positions of the subscribers' user devices. The core network may include a packet network, e.g., an Evolved Packet Core (EPC) that interconnects different components belonging to an Evolved Packet System (EPS). EPC is a framework for providing converged voice and data on a 4G LTE network. EPC unifies voice and data on an Internet Protocol (IP) service architecture. The EPC allows the operator of the cellular network to deploy and operate one packet network for wireless access (e.g., 2G, 3G, 4G, 5G) and fixed access such as Ethernet, DSL, cable, and fiber.

Each of the user devices 110 and 122 may be a desktop computer, a laptop computer, tablet computer, a smartphone, a smartwatch, a personal digital assistant (PDA), or any other computing device or mobile device that is capable of communicating with other devices via a network. Each of the user devices 110 and 122 are capable of direct wireless communications (e.g., Bluetooth) with other devices. As illustrated, the user device 110 is in direct wireless communications with IoT devices 112, 114, and 116. The user device 122 is in direct wireless communications with IoT devices 128, 130, and 132. Such direct wireless communications between the IoT devices and the user devices may consume less power than direct wireless communications between the IoT devices and the network infrastructure 102 (e.g., through the base station 104).

A user device may be configured to be a designated LGMD to manage the network access by IoT devices in its vicinity. For example, a smart phone may download and execute an IoT Management app that configures the smart phone to serve as the LGMD of a group of co-located IoT devices. In the example, the user devices 110 and 122 are both configured by the IoT management app and serving as LGMDs. Specifically, the user device 110 is serving as the LGMD of the IoT devices 112, 114, and 116, and the user device 122 is serving as the LGMD of the IoT devices 128, 130, and 132.

In some embodiments, a user device configured as a LGMD may identify a group of IoT devices to manage. The IoT devices in the group may communicate with each other wirelessly through a local wireless network (e.g., Bluetooth) operated by the LGMD. The LGMD may upload data to the network infrastructure 102 for all devices in the group. The LGMD may also receive information from the network and translate the received information into active local management of the (IoT) devices in the group. This allows the LGMD to represent the other devices in the group while the other devices are powered down or put on standby. For example, the IoT devices may turn off direct communications with the wireless telecommunications service provider network, and the lower power/local communications to communicate with network infrastructure 102 through the LGMD, but are otherwise normally active. The communications between the LGMD and the IoT devices in the group are encrypted so that malignant devices cannot intercept messages being exchanged by devices of the group.

The group of IoT devices managed by the LGMD may be identified based on a group ID. For example, the LGMD may receive a group ID from the telecommunications service provider (TSP) and use the received group ID to identify co-located IoT devices that share the same group ID as belonging to the group of IoT devices to be managed by the LGMD. Such a group ID may be created to correspond to a particular event or activity such as a school field trip. The IoT devices of the participants of the event (e.g., watches, smart phones, or wearable tags, and other types of devices worn by the students participating in the field trip) are assigned the group ID. A particular user device (e.g., a smart phone belonging to a teacher planning the field trip) may serve as the LGMD. In some embodiments, users of smartphones and IoT devices may register or otherwise affiliate their devices with different groups, associations, or organizations with the TSP. Users of the smart phones and IoT devices may also sign up for a group associated with a particular upcoming event (such as a school field trip) such that the membership in the group is limited to a geographic area and/or time window.

In some embodiments, an LGMD may make a group on the fly by sensing nearby IoT devices and propose a group to the TSP. The LGMD may also recognize a nearby IoT device belonging to the group and add it the group. In some embodiments, the TSP may request a user device to be an LGMD of a particular group of IoTs based on the LGMD's proximity to IoT devices in the group. In some embodiments, whether a particular IoT device is added to the group is subject to prior permissions set for the IoT device, e.g., an IoT device may have a permission setting that that prevents or allows management by the LGMD.

Figure 2A:
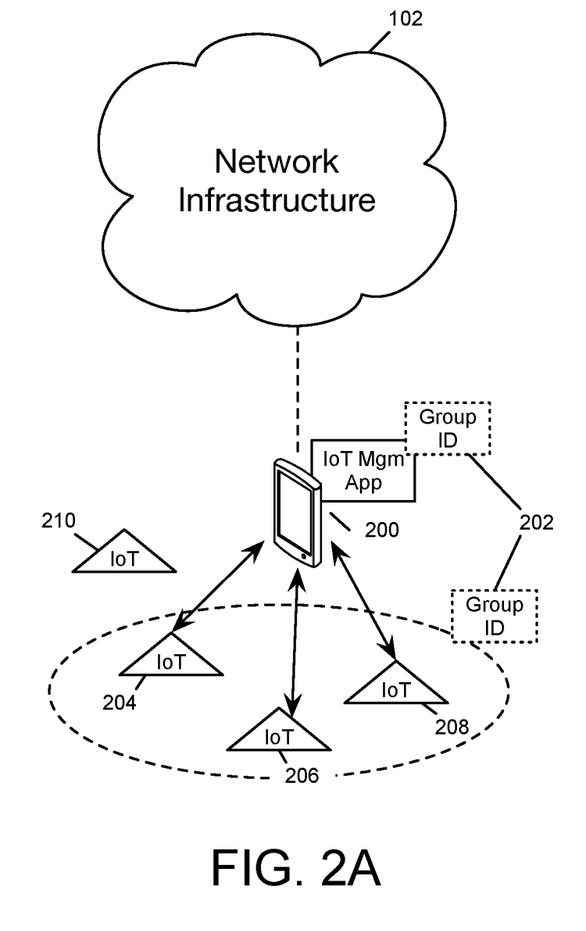
FIGS. 2A-B conceptually illustrates a LGMD representing a group of IoT devices that share a same group ID.
Figure 2B:
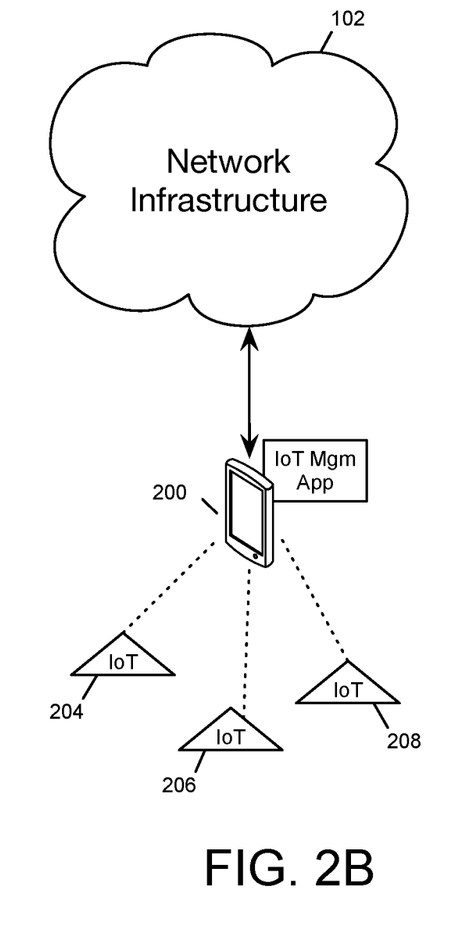

FIG. 2A-B conceptually illustrate a LGMD 200 representing a group of IoT devices that share a same group ID. The LGMD 200 is a user device such as a smart phone that is configured to act as a LGMD by an IoT management App. The LGMD manages a local group of IoT devices having a group ID 202. The group ID 202 may be an ID issued by the telecommunications provider operating the network 100 and the network infrastructure 102.

FIG. 2A illustrates the LGMD 200 communicating with IoT devices 204, 206, 208, and 210. Among these, the IoT devices 204, 206, and 208 are assigned the group ID 202, and the LGMD 200 is able to recognize them as the IoT devices to be managed based on the group ID 202. The IoT device 210 is not assigned the group ID 202 and therefore not to be managed or represented by the LGMD 200.

FIG. 2B illustrates the LGMD 200 managing or representing the IoT devices. The LGMD 200 communicates with the network infrastructure 102 (through e.g., base stations, Internet, or WLAN) to upload or download information on behalf of the IoT devices. The IoT devices 204, 206, and 208 in the group are in low power mode and not in active communications with the network infrastructure 102. The LGMD 200 may provide the downloaded information to the represented IoT devices or retrieve information to be uploaded to the network infrastructure 102 from the represented IoT devices using a lower powered communications medium (e.g., Bluetooth). Such communications may take place by using designated time slots and/or designated network resources to minimize power usage by the IoT devices and/or to minimize data traffic congestion at the network infrastructure 102. For example, using designated time slots may allow the network infrastructure to schedule interleaving of data traffic generated by the IoT devices 204, 206, and 208 with data traffic generated by other devices.

In some embodiments, the network may actively manage IoT device power consumption and reduce network traffic congestion using knowledge (certain or predicted) of upcoming events. Network intelligence or computing resources may also be used to track and predict usage patterns of a particular IoT device. The behavior of an IoT device may be configured to accomplish objectives of the usage pattern, for example, to reduce unnecessary power consumption in present activities and to ensure that sufficient power is available for a later activity or event that the IoT device will participate in.

FIG. 3A-D conceptually illustrates usage information and network resource information being used to generate configuration update data for IoT devices. In the example, the LGMD 200 collects usage information regarding the IoT devices 204, 206 and 208, and configuration update data for IoT devices are generated based on the collected usage information in order to moderate network congestion and power consumption.

Figure 3A:
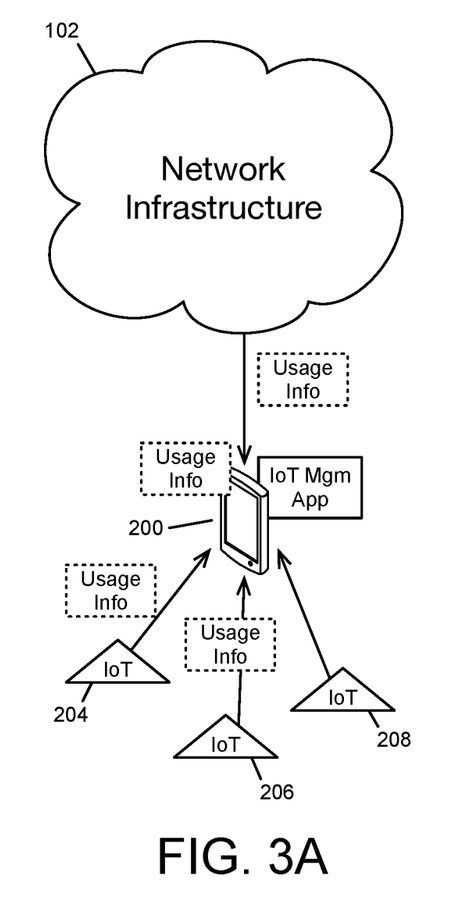
FIGS. 3A-D conceptually illustrates usage information and network resource information being used to generate configuration update data for IoT devices.

FIG. 3A illustrates the LGMD 200 collecting usage information from various sources, specifically, from IoT devices 204, 206 and 208 in the group that the LGMD manages, from the LGMD 200 itself, and from elsewhere in the network 100 or the network infrastructure 102. The collected usage information may be indicative of the purposes and activities of the users (involving the IoT devices) in that area. For example, the usage information collected from the LGMD itself may include the user's calendar that indicates an upcoming event; the usage information collected from the IoT devices may include historical records of events that indicate a usage pattern; the information collected elsewhere in the network may include usage records of network resources; the usage information collected elsewhere in the network may include information from the Internet about upcoming events that are to take place locally; the information collected elsewhere in the network may also include a user's calendar accessible from the Cloud. The collected usage information is to be used to predict future power consumption and network resource usage by the IoT devices. The collected usage information may also be used for billing purposes.

Figure 3B:
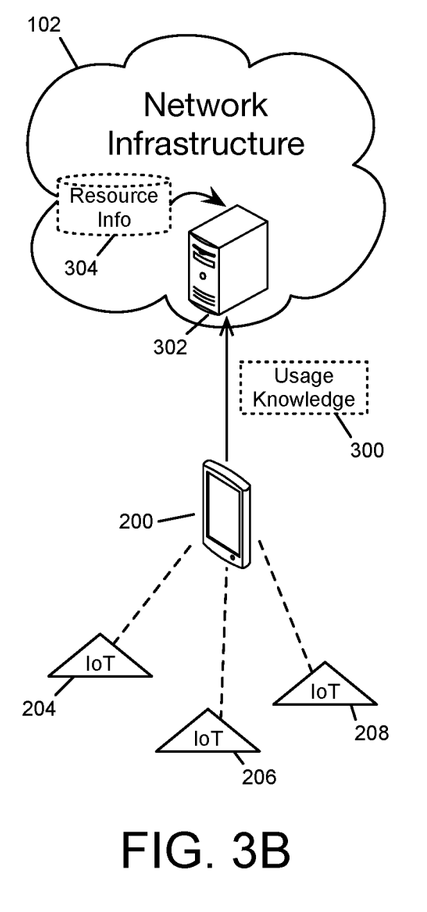

FIG. 3B illustrates the LGMD 200 generating a set of usage knowledge 300 based on the collected usage information. The usage knowledge may include the group ID of the group of IoT devices and/or UIDs of the individual IoT devices represented by the LGMD 200. In some embodiments, the usage knowledge 300 identifies the location and time of upcoming events and provides an estimate of the network resources that are needed by the IoTs represented by the LGMD 200. The usage knowledge 300 may also include indications of the purposes of the upcoming events. The LGMD uploads the usage knowledge 300 to a resource manager 302 in the network 100. The IoT management application running on the LGMD 200 generates the usage knowledge 300 in a format or protocol that is understood by the resource manager 302.

The network manager 302 may be a software running on a server or a function that is implemented by multiple computing resources in the network infrastructure 102. The network manager 302 may process multiple sets of usage knowledge from multiple LGMDs, including the usage knowledge 300 from the LDMD 200.

Figure 3C:
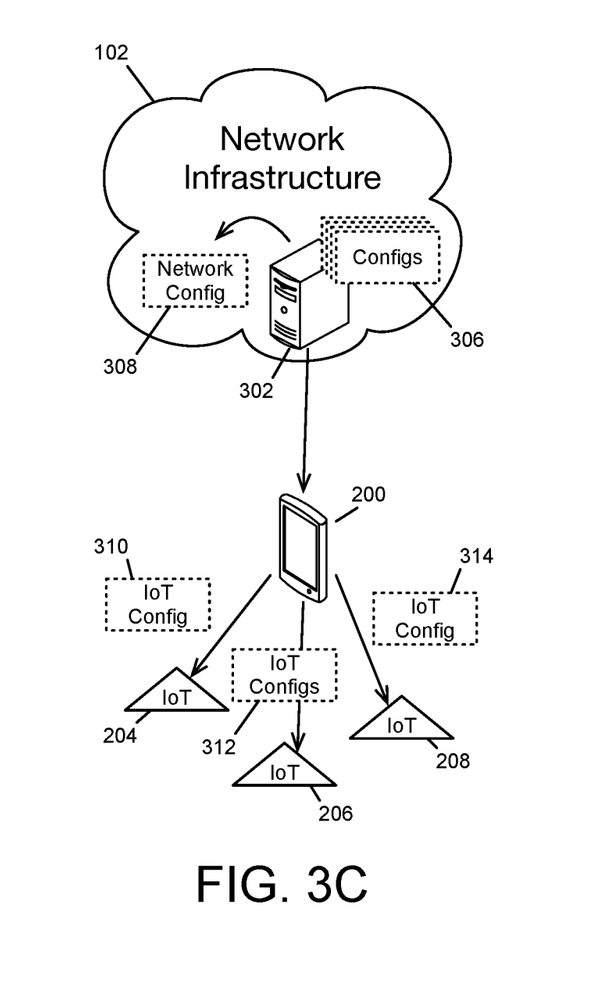

FIG. 3C illustrates the resource manager 302 generating the configuration update data for configuring network resources and IoT devices. The resource manager 302 has access to network resource information 304 regarding the network resources in the network infrastructure 102. Based on the network resource information 304, the uploaded usage knowledge 300 from the LGMD 200, and usage knowledge collected from other LGMDs, the resource manager 302 determines a set of configuration update data 306.

The configuration update data 306 may include network resource configuration data 308 for configuring specific network resources in the network infrastructure 102 and IoT configuration data 310, 312, and 314 for configuring specific IoT devices. For example, the network resource manager 302 may use the location and time identified by the usage knowledge 300 to identify the network resources that will be used or required by the IoT devices. The network resource manager in turn computes the configuration update data to schedule traffic from the IoT devices and other sources to minimize congestion at the identified network resources. The configuration update data may also set communication parameters such as base frequency, base power, wakefulness mode, or other settings of the IoT devices. The configuration update data may also specify the types of information to be uploaded, the level of detail of the information being uploaded, etc. The network resource manager may also generate the configuration update data to conserve power and resources in the IoT devices based on the network resource information 304 and the uploaded usage knowledge 300. The network resource manager may determine the configuration update data based on the activities, the time frame, and the location of the upcoming events.

Figure 3D:
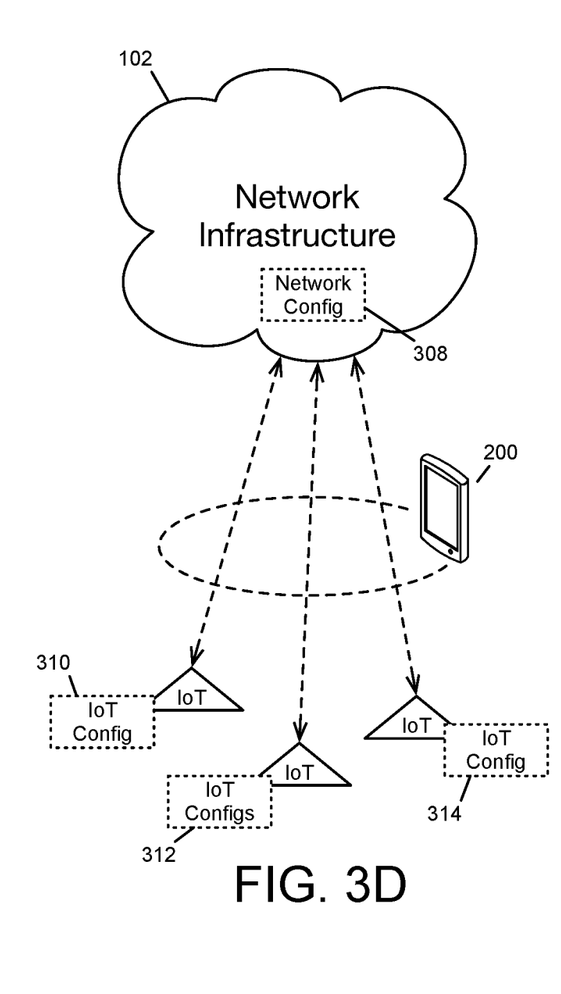

The IoT configuration data 310, 312, and 314 may include various communications settings for the IoT devices 204, 206, and 208, respectively. FIG. 3D illustrates the network resources and the IoT devices operating according to the configuration update data 306, which includes the network resource configuration data 308 and the IoT configuration data 310, 312, and 314. The network resource configuration data 308 are generated to minimize network congestion at the time and location of the upcoming events identified by the usage knowledge 300. The IoT configuration data 310, 312, and 314 configures the IoT devices to go into low power mode or sleep mode at the appropriate time in order to minimize power consumption. The IoT devices 204, 206, and 208 represented by the LGMD 200 may directly communicate with the network infrastructure 102 or through the LGMD 200 (by e.g., using Bluetooth to communicate with LGMD 200 and having the LGMD 200 uploading and downloading data for the IoT devices.)

For example, a local area event may be scheduled for dog owners having IoT devices attached to their dogs—e.g., a gathering in a park or a dog show. A laptop or a smart phone of a participant attending the event may serve as an LGMD for some of the IoT devices of the local area. The LGMD collects information about the dog show and generates usage knowledge for the wireless network. Based on the usage knowledge, the network predicts that the network congestion will be severe for users in that vicinity. The network (proactively or reactively) sends changed communication settings to the IoT devices (through the LGMD) to reduce a frequency, level of information detail, and/or transmission power level for communications that the IoT devices regularly send to the network and thereby reduces or proactively forestalls network traffic congestion in that local area. Given (local or network) foreknowledge that particular users will attend the event (e.g., signaled by the particular users' calendar entries and delivered to the network as usage knowledge 300), the network (e.g., the network resource manager 302) updates configuration data and sends out the configuration update data to the IoT devices ahead of time. The configuration update data causes the IoT devices to access the network infrastructure 102 at specific time slots or at specific periodic intervals in order to moderate network traffic load. A change in purpose, for example, to resolve an urgent or emergency situation, can also merit an adjustment from the network. For example, if a dog is separated from its owner, the owner can request a higher priority communication setting for the IoT device for that dog so that the device communicates more frequently and effectively to help locate and retrieve the dog.

More generally, knowledge of a user's activity may be used to indicate an appropriate level of communication, corresponding IoT device power consumption, and usage of network communication resources, with or without having a user device being configured as an LGMD. For example, a boat may be equipped as an IoT device for providing real-time information regarding the boat. Based on reported and/or scheduled activities (usage knowledge) of the boat, the IoT device may be configured to use lower power or less frequent communication to provide basic information from the boat when the boat is docked, while the IoT device may be configured to use higher power or more frequent communication to obtain detailed information from the boat when the boat is moving.

In another example, when the network has usage knowledge that an IoT device is moving into a zone with minimal or unavailable communications (e.g., based on GPS coordinates of the IoT device) that may require higher transmission power to communicate, the network preemptively configures the IoT device to reduce communications attempts, power down (or go into a low power mode), and do no more than gathering data until easier communication is available. Preemptively configuring the IoT device may allow the IoT device to minimize energy and bandwidth expenditure when establishing or maintaining communications in the minimal communication zone (by e.g., temporarily suspending communications). Preemptively configuring the IoT devices may be applied to commercial asset tracking. For example, a tracking system relying on a cellular network to track packages may recognize (or have foreknowledge) that a package is in a metal box or is traveling through a tunnel and is therefore temporarily incommunicado. The system and the IoT devices may be configured to wait (e.g., the IoT device configured to be in a sleep mode and/or the system configured to refrain from pinging for a predetermined amount of time) rather than escalating power usage in an attempt to re-establish the connection between the system and the package.

Other examples of preemptively configuring IoT devices to moderate power consumption based on usage knowledge include: an IoT device in a power harvesting setting configured to act based on the characteristics and constraints of its local power sources (e.g., solar, vibration); an IoT device configured to operate in a low energy mode to "limp home" based on the level of remaining power of the device; and an IoT device equipped with GPS configured to use local Wi-Fi rather than GPS when a local Wi-Fi provides sufficient positioning information. (The GPS receivers may power up periodically to cross-check location or accuracy of the Wi-Fi or other location reference signal.)

Example LGMD

Figure 4:
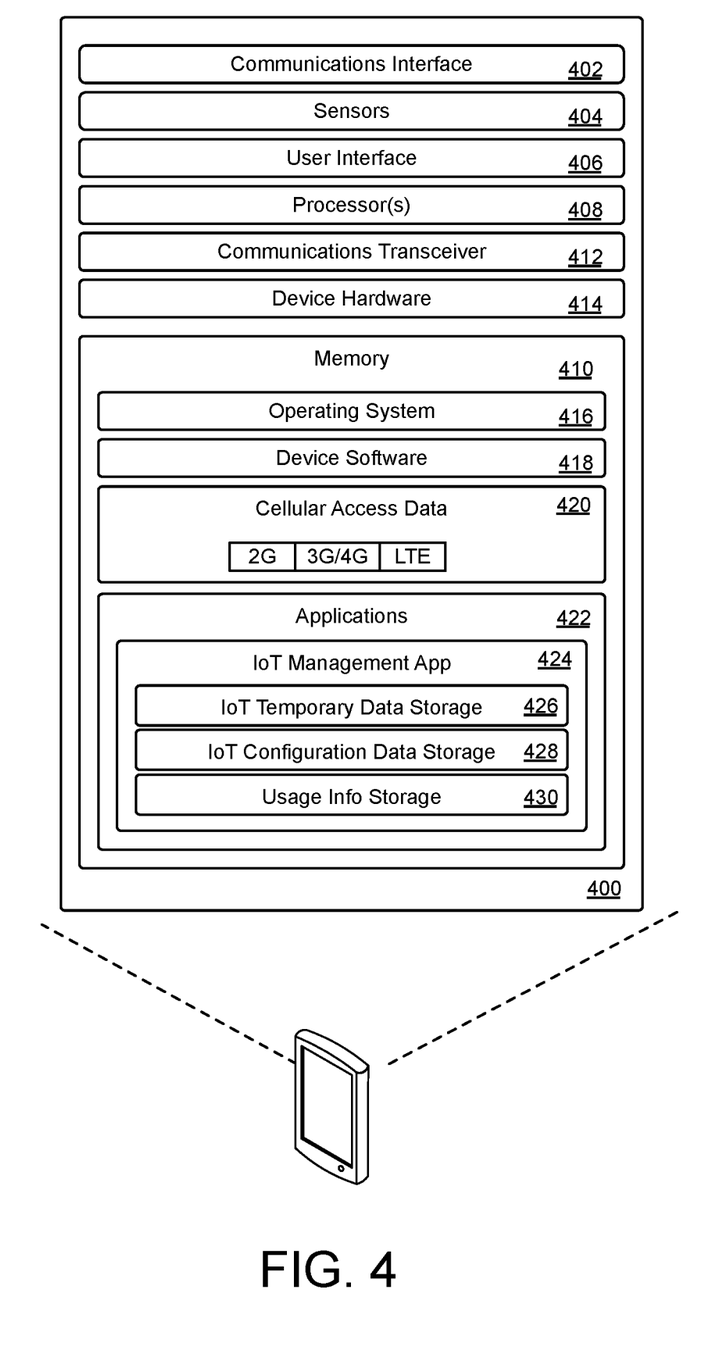
FIG. 4 is a block diagram showing various components of an example user device that may serve as a LGMD for a group of local IoT devices.

FIG. 4 is a block diagram showing various components of an example user device 400 that may serve as a LGMD for a group of local IoT devices. The user device 400 may include a communications interface 402, one or more sensors 404, a user interface 406, one or more processors 408, and memory 410. The communications interface 402 may include wireless and/or wired communication components that enable the user device 400 to transmit or receive voice or data communication over cellular networks and/or Wi-Fi networks.

The sensors 404 may include a proximity sensor, a compass, an accelerometer, altimeter, cameras, and/or a global positioning system (GPS) sensor. The proximity sensor may detect movement of objects that are proximate to the user device 400. The compass, the accelerometer, and the GPS sensor may detect orientation, movement, and geolocation of the user device 400.

The user interface 406 may enable a user to provide input and receive output from the user device 400. The user interface 406 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 410 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, random access memory (RAM), read-only memory (ROM), electrically erasable programmable ROM (EEPROM), flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 400 may also include communications transceivers 412 and device hardware 414. The communication transceivers are hardware components that enable the user device 400 to perform telecommunication and data communication with the multiple communication networks. The device hardware 414 may include other hardware that is typically located in a mobile telecommunication device. For example, the device hardware 414 may include signal converters, transceivers, antennas, hardware decoders and encoders, graphic processors, a subscriber identity module (SIM) card slot, and/or the like that enable the user device 400 to execute applications and provide telecommunication and data communication functions. An integrated circuit chip such as a SIM may be inserted into the SIM card slot of the user device 400. Alternatively, an embedded SIM may be hardwired into the circuit board of the user device 400.

The one or more processors 408 and the memory 410 of the user device 400 may implement an operating system 416, device software 418, cellular access data 420, and one or more applications 422, which may include an IoT management application 424. The various software and applications may include routines, program instructions, objects, and/or data structures that perform particular tasks or implement particular abstract data types. The operating system 416 may include components that enable the user device 400 to receive and transmit data via various interfaces (e.g., user controls, communications interface 402, and/or memory input/output devices). The operating system 416 may also process data using the one or more processors 408 to generate output based on input that is received via the user interface 406. For example, the operating system 416 may provide an execution environment for the execution of the applications 422. The operating system 416 may include a presentation component that presents the output (e.g., display the data on an electronic display, store the data in memory, transmit the data to another electronic device, etc.).

The operating system 416 may include an interface layer that enables applications to interface with the communication transceivers 412 and/or the communications interface 402. The interface layer may comprise public APIs, private APIs, or a combination of both public APIs and private APIs. Additionally, the operating system 416 may include other components that perform various other functions generally associated with an operating system.

The device software 418 may include software components that enable the user device 400 to perform functions. For example, the device software 418 may include basic input/output system (BIOS), Boot ROM, or a bootloader that boots up the user device 400 and executes the operating system 416 following power up of the device. The cellular access data 420 may store credentials for accessing 2G, 3G, 4G, or Long-Term Evolution (LTE) networks.

The applications 422 may include applications or programs that provide utility, entertainment, and/or productivity functionalities to a user of the user device 400. The applications 422 may further include electronic mail applications, remote desktop applications, web browser applications, navigation applications, office productivity applications, multimedia streaming applications, and/or so forth.

The IoT management application 424 is one of the applications 422 that may be downloaded from the Internet. The IoT management application 424 configures the user device 400 to act as a LGMD. The IoT management application 424 identifies IoT devices that are to be included in a group based on a group ID. The IoT management application 424 also uploads and downloads data to and from the IoT devices. The uploaded data and the downloaded data are temporarily stored in an IoT temporary data storage 426. The IoT management application 424 also receives IoT configuration data and stores the configuration data in an IoT configuration data storage 428. The IoT management application 424 waits for an opportune time to deliver the temporarily stored uploaded/downloaded data. This allows IoT devices to operate in low power mode or shutdown while the LGMD communicate with the network on behalf of the IoT devices.

The IoT management application 424 may collect usage information from other programs running on the user device 400, such as the content of a calendar application. The IoT management application 424 may also use the communications interface 402 to collect usage information from the IoT devices and the TSP network infrastructure. The collected usage information is stored in a usage information storage 430 and used to generate usage knowledge by the IoT management application 424. In some embodiments, the IoT management application 424 may specify the types information and the level of detail to be included in the usage knowledge based on a user input or a network setting. The IoT management application 424 uses the communications interface 402 to send the generated usage knowledge to the network (e.g., network resource manager).

In some embodiments, the IoT management application 424 may configure and reconfigure the device 400 to act as an LGMD for different IoT device groups, events, etc., for example, at the command or request of the telecommunications service provider (TSP) or in response to the user's selection (subject to TSP approval/ratification/agreement). In some embodiments, the IoT management application 424 may inform the user that his or her user device is to function as an LGMD for a specified group of IoT devices and optionally obtain the user's agreement.

Figure 5:
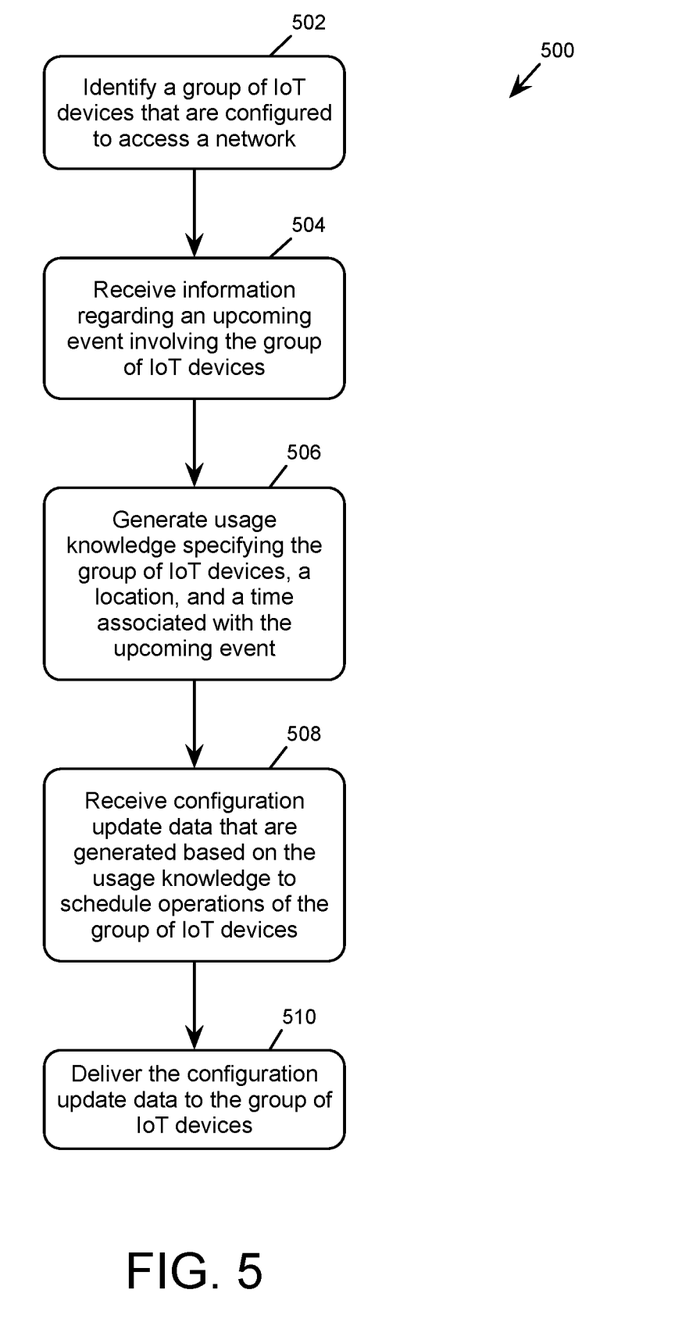
FIG. 5 conceptually illustrates a flow diagram of an example process performed by a LGMD, which may be a mobile device running an IoT management application.

FIG. 5 conceptually illustrates a flow diagram of an example process 500 performed by an LGMD, which may be a mobile device running an IoT management application. The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 502, the LGMD identifies a group of Internet of Things (IoT) devices that are configured to access a network. The LGMD may identify the IoT devices belonging to the group based on a group identifier issued by a service provider of the network. The LGMD may also identify IoT devices to be included in the group based on a list of device identifiers provided by the TSP. The process then proceeds to 504.

At block 504, the LGMD receives information regarding an upcoming event involving the group of IoT devices. The LGMD may receive such information from the Internet, the TSP network, the IoT devices, or the storage of the LGMD itself. For example, in some embodiments, the LGMD may access a calendar stored in the LGMD mobile device to retrieve the information about the upcoming event. The process then proceeds to 506.

At block 506, the LGMD generates usage knowledge specifying the group of IoT devices, a location, and a time associated with the upcoming event. The usage knowledge may also include an indication of the purpose or nature of the upcoming event that can be processed or mapped by the network resource manager into scheduling decisions, for example, as variously described herein with respect to different embodiments.

At block 508, the LGMD receives configuration update data that are generated based on the usage knowledge to schedule operations of the group IoT devices. In some embodiments, the configuration update data is generated based on information regarding network resources that are used by the group of IoT devices. The network resource information may include historical usage information and projected availability of various network resources. The network resources may be identified based on the time and the location specified by the usage knowledge. The configuration data may be generated by the TSP network (e.g., at a network resource manager) based on the network resource information and/or the usage knowledge uploaded to the TSP network. The configuration data may also be generated by the LGMD based on the usage knowledge and network resource information received from the TSP network. The process then proceeds to 510.

At block 510, the LGMD delivers the configuration update data to the group of IoT devices. The configuration update data causes the group of IoT devices to operate according to a schedule that minimizes congestion at the identified network resources. An IoT device in the group may be configured by the configuration update data to conserve power and resources, e.g., to operate in a low power mode when the IoT device is not scheduled to access the network, when the power level of the IoT device is lower than a given threshold, or when the IoT device is stationary and unlikely to have new data, etc.

Example Network Resource Manager

Figure 6:
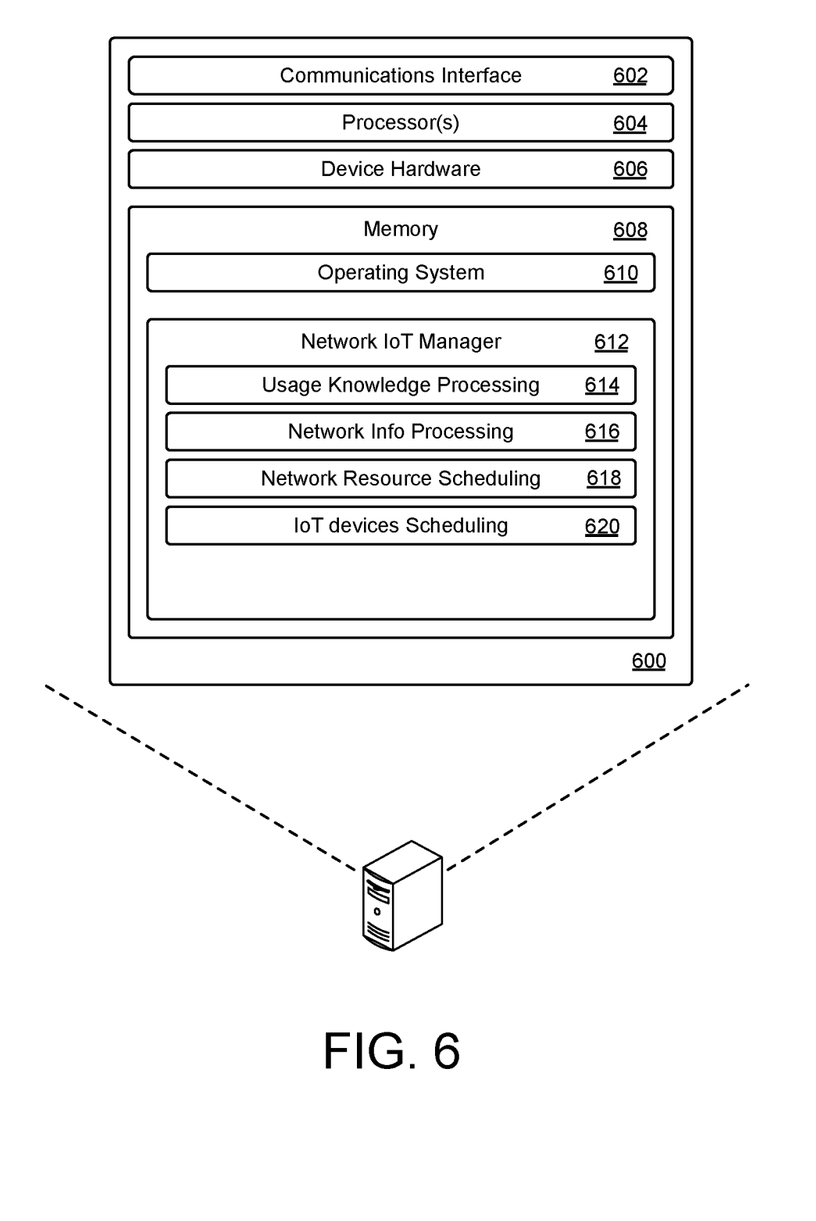
FIG. 6 is a block diagram showing various components of a network resource manager.

FIG. 6 is a block diagram showing various components of a network resource manager, consistent with an embodiment of the disclosure. The network resource manager receives usage knowledge from a LGMD and/or other endpoints in the network infrastructure regarding network usage by a group of IoT devices at a particular location at a particular time period. The network resource manager also receives network resource information that allows the network resource manager to identify network resources that may be affected by data traffic to and from the group of IoT devices at the particular time period.

The figure illustrates a computing device 600 implementing a network resource manager (e.g., the network resource manager 302). The computing device 600 may be a general-purpose computer, such as a desktop computer, tablet computer, laptop computer, server, or an electronic device that is capable of receiving input, processing the input, and generating output data. The computing device 600 may also be a virtual computing device such as a virtual machine or a software container that is hosted in a cloud. Alternatively, the computing device 600 may be substituted with multiple computing devices, virtual machines, software containers, and/or so forth.

The computing device 600 may be equipped with one or more of the following: a communications interface 602, one or more processors 604, device hardware 606, and memory 608. The communications interface 602 may include wireless and/or wired communication components that enable the computing devices to transmit data to and receive data from other devices. The data may be relayed through a dedicated wired connection or via a communications network. The device hardware 606 may include additional hardware that performs user interface, data display, data communication, data storage, and/or other server functions.

The memory 608 may be implemented using a computer-readable medium, such as a computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM (Random Access Memory), ROM (Read Only Memory), EEPROM (Electrically Erasable Programmable Read Only Memory), flash memory or other memory technology, CD-ROM (Compact Disc-Read Only Memory), digital versatile disks (DVD) or other optical storage, magnetic cassettes, magnetic tape, magnetic disk storage or other magnetic storage devices, or any other non-transitory medium that can be used to store information for access by a computing device. In contrast, communication media may embody computer-readable instructions, data structures, program modules, or other data in a modulated data signal, such as a carrier wave, or other transmission mechanisms.

The processors 604 and the memory 608 of the computing device 600 may implement an operating system 610 and a network IoT manager 612. The various software may include routines, program instructions, objects, and/or data structures that are executed by the processors 604 to perform particular tasks or implement particular abstract data types.

The operating system 610 may include components that enable the computing devices 600 to receive and transmit data via various interfaces (e.g., user controls, communications interface, and/or memory input/output devices), as well as process data using the processors 604 to generate output. The operating system 610 may include a presentation component that presents the output (e.g., display the data on an electronic display, store the data in memory, transmit the data to another electronic device, etc.). The operating system 610 may include a hypervisor that allows the computing device to operate one or more virtual machines and/or virtual network components. Additionally, the operating system 610 may include other components that perform various additional functions generally associated with an operating system.

The network IoT manager 612 is a program that manages network resources and generates configuration update data for IoT devices. The network IoT manager 612 includes a usage knowledge processing module 614, a network information processing module 616, a network resource scheduling module 618, and an IoT devices scheduling module 620.

The usage knowledge processing module 614 receives usage knowledge information from an LGMD, the Internet, and/or other components of the network infrastructure. The received usage knowledge may include details of an upcoming event, including the time, location, and identities of IoT devices (e.g., based on group ID) that are expected to generate network traffic during the upcoming event. The usage knowledge may also include an indication of the purpose or nature of the upcoming event that can be processed or mapped by the network resource manager into scheduling decisions.

The network information processing module 616 receives network resource information regarding the network infrastructure. The received network resource information may include historical usage information and projected availability of various network resources. Based on the received usage knowledge and the network resource information, the network IoT manager 612 may identify the network resources that are to be used by the data traffic with the IoT devices and determine a network usage schedule for the IoT devices and the network resources to minimize traffic congestion and power consumption.

Based on the determined network usage schedule, the network resource scheduling module 618 generates a configuration update for configuring network resources to implement the network usage schedule. The IoT device scheduling module 620 also generates a configuration update for configuring the IoT devices to implement the network usage schedule. The IoT device scheduling module 620 may also generate the configuration update to configure IoT devices to conserve their power and resources based on information available to the TSP network. The configuration update for IoT devices may be provided to the IoT devices through the LGMD as download.

Figure 7:
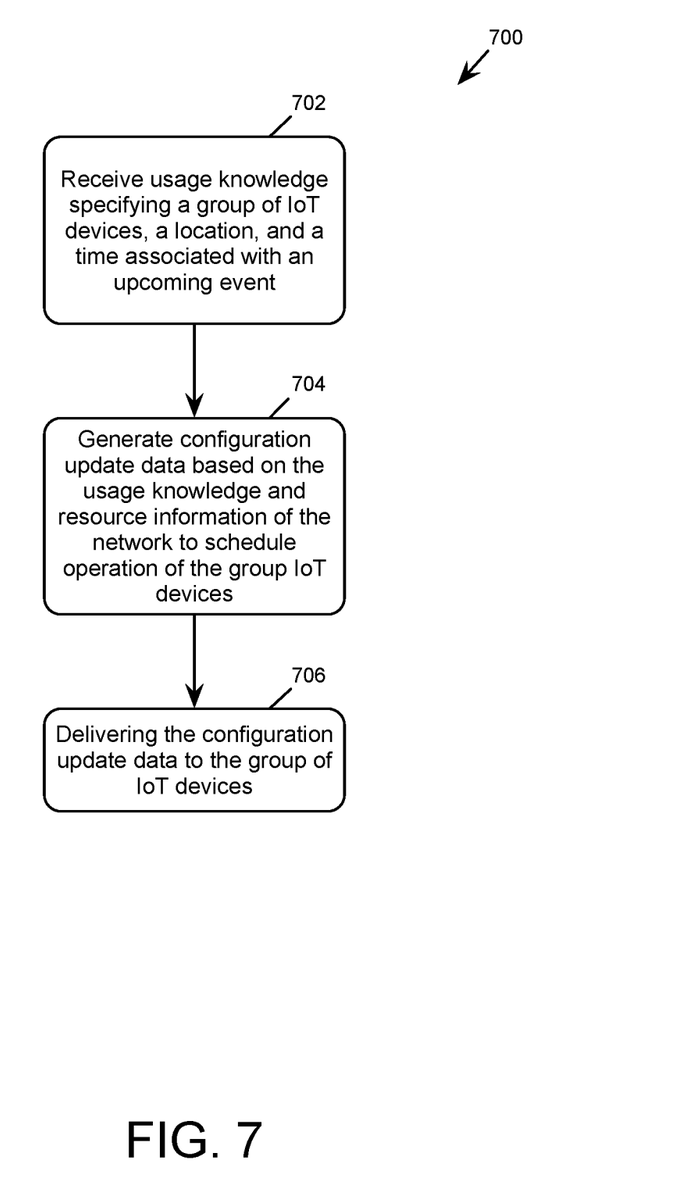
FIG. 7 conceptually illustrates a flow diagram of an example process performed by a network resource manager.

FIG. 7 conceptually illustrates a flow diagram of an example process 700 performed by a network resource manager, which may be a computing device or server that is provided as part of the network infrastructure. The process 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 702, the network resource manager receives usage knowledge specifying a group of Internet of Things (IoT) devices, a location, and a time associated with an upcoming event. In some embodiments, the usage knowledge is received from a user device that is configured by an IoT management application to serve as an LGMD that represents and/or manages the group of IoT devices. The network resource manager may also receive the usage knowledge from elsewhere in the network or from the Internet. The process then proceeds to 704.

At block 704, the network resource manager generates configuration update data based on the usage knowledge and resource information of the network to schedule operations of the group IoT devices. In some embodiments, the network resource manager uses the network resource information to identify network resources that are used by the group of IoT devices at the time and the location specified by the usage knowledge. The network resource information may also include historical usage information and projected availability of various network resources. The process then proceeds to 706.

At block 706, the network resource manager delivers the configuration update data to the group of IoT devices. The network resource manager may send the configuration update data to the LGMD representing the group of IoT devices and have the LGMD distribute the configuration update data to individual IoT devices. The configuration update data causes the group of IoT devices to operate according to a schedule that minimizes congestion at the identified network resources. An IoT device in the group may be configured by the configuration update data to conserve power and resources, e.g., to operate in a low power mode when the IoT device is not scheduled to access the network, when the power level of the IoT device is lower than a given threshold, or when the IoT device is stationary and unlikely to have new data, etc.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
    one or more processors; and
    a computer-readable medium storing a plurality of computer-executable components that are executable by the one or more processors to perform a plurality of actions, the plurality of actions comprising:
    receiving, from a user device, usage knowledge that is derived from usage information, the usage information including information collected from one or more programs on the user device that indicates an upcoming event scheduled for a plurality of participants to attend is in proximity to a group of Internet of Things (IoT) devices that are accessing a network;
    predicting a power consumption and network resource usage of each of particular IoT devices included in the group of IoT devices based upon the usage knowledge;
    generating configuration update data based at least upon a predicted power consumption and network resource usage of each of the IoT devices; and
    delivering, via the user device, the configuration update data to the IoT devices to at least one of minimize power consumption by the particular IoT devices or moderate network traffic load on the network by the particular IoT devices during the upcoming event scheduled for the plurality of participants to attend,
    wherein an IoT device of the particular IoT devices is configured by the configuration update data to operate in a shutdown mode when the user device is designated as a local group management device (LGMD) that communicates with the network on behalf of the IoT devices.

2. The computing device of claim 1, wherein the usage information indicative of purposes and activities that are associated with the group of IoT devices.

3. The computing device of claim 1, wherein the usage information includes a location and time of the upcoming event.

4. The computing device of claim 1, wherein the usage information further includes historical records of events that indicate a usage pattern.

5. The computing device of claim 1, wherein the usage information further includes additional information that is collected from the network and the group of IoT devices.

6. The computing device of claim 1, wherein the particular IoT devices are identified based on a group identifier issued by a service provider of the network.

7. The computing device of claim 1, wherein the usage knowledge indicates a purpose of the upcoming event that is processed by a network resource manager of the network into scheduling decisions for a network usage schedule that minimizes power consumption by the particular IoT devices or moderates network traffic load on the network by the particular IoT devices during the upcoming event.

8. One or more non-transitory computer-readable media of a computing device storing computer-executable instructions that upon execution cause one or more processors to perform acts comprising:
    receiving from a user device usage knowledge;
    predicting a power consumption and network resource usage of each Internet of Things (IoT) device in a group of IoT devices that are accessing a network based upon the usage knowledge;
    generating configuration update data based at least upon a predicted power consumption and network resource usage of each IoT device; and
    delivering, via the user device, the configuration update data to the IoT devices to configure at least one IoT device of the IoT devices to operate in a shutdown mode when the user device is designated as a local group management device (LGMD) that communicates with the network on behalf of the IoT devices.

9. The one or more non-transitory computer-readable media of claim 8, wherein the usage knowledge is derived from usage information, the usage information further including information collected from one or more programs on the user device that indicates an upcoming event is in proximity to the group of IoT devices that are accessing the network.

10. The one or more non-transitory computer-readable media of claim 8, wherein the usage knowledge is derived from usage information that is indicative of purposes and activities that are associated with the IoT devices.

11. The one or more non-transitory computer-readable media of claim 10, wherein the usage information includes a location and time of an upcoming event.

12. The one or more non-transitory computer-readable media of claim 10, wherein the usage information includes historical records of events that indicate a usage pattern.

13. The one or more non-transitory computer-readable media of claim 10, wherein the usage information is collected from the network and the IoT devices.

14. The one or more non-transitory computer-readable media of claim 8, wherein the IoT devices are identified based on a group identifier issued by a service provider of the network.

15. The one or more non-transitory computer-readable media of claim 8, wherein the usage knowledge indicates a purpose of an upcoming event is processed by a network resource manager of the network into scheduling decisions for a network usage schedule that minimizes power consumption by the group of IoT devices or moderates network traffic load on the network by the group of IoT devices during the upcoming event.

16. A computer-implemented method, comprising:
receiving from a user device a usage knowledge;
predicting a power consumption and network resource usage of each Internet of Things (IoT) device in a group of IoT devices that are accessing a network based upon the usage knowledge;
generating configuration update data based at least upon a predicted power consumption and network resource usage of each IoT device; and
delivering, via the user device, the configuration update data to the IoT devices to configure at least one IoT device to operate in a shutdown mode when the user device is configured as a designated local group management device (LGMD) that communicates with the network on behalf of the IoT devices.

17. The computer-implemented method of claim 16, wherein the usage knowledge is derived from usage information that is indicative of purposes and activities that are associated with the IoT devices.

18. The computer-implemented method of claim 16, wherein the IoT devices are identified based on a group identifier issued by a service provider of the network.

* * * * *